(12) United States Patent
Simmons et al.

(10) Patent No.: US 7,446,434 B1
(45) Date of Patent: Nov. 4, 2008

(54) DUAL MODE POWER MANAGEMENT SYSTEM

(75) Inventors: John W Simmons, Tamarac, FL (US); James G Mittel, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/544,228

(22) Filed: Apr. 7, 2000

(51) Int. Cl.
*H02J 1/00* (2006.01)
(52) U.S. Cl. .......................... 307/75; 320/138
(58) Field of Classification Search ............... 307/75, 307/64, 46, 66, 48, 43, 72; 300/103, 138
See application file for complete search history.

(56) References Cited

U.S. PATENT DOCUMENTS 5,500,561 A * 3/1996 Wilhelm ................... 307/64
5,650,669 A * 7/1997 Aldous ..................... 307/66

* cited by examiner

*Primary Examiner*—Edward H. Tso
*Assistant Examiner*—Lawrence Lur
(74) *Attorney, Agent, or Firm*—Randi L. Karpinia; Hisashi D. Watanabe

(57) ABSTRACT

A power management system has a primary power source (100) and a secondary power source (106) generated from the primary power source (100) with a power output selector (204) coupled to each for selecting power for a regulated power output (212). First, during initialization and at any other time during operation, when the primary power source (102) exceeds the secondary power source (106), the primary power source (102) is used as a power supply for the regulated power output (212). Second, at any time after initialization that the primary power source (102) exceeds the regulated power output (212), the primary power source (102) is used as the power supply for the regulated power output (212). Third, at any time after initialization that the secondary power source (106) exceeds the primary power source (106) and the primary power source (102) is less than the regulated power output (212), the secondary power source (106) is used as the power supply for the regulated power output (212).

17 Claims, 3 Drawing Sheets

DUAL MODE POWER MANAGEMENT SYSTEM

FIELD OF THE INVENTION

This invention relates in general to power generation and regulation circuits and more particularly to an improved low voltage, low power generation and regulation circuit.

BACKGROUND OF THE INVENTION

In portable battery operated products such as a wireless selective call capable device, many attempts have been made to design circuits that effectively control and distribute power to functional circuits within the device. Prior art systems have used both capacitive and inductive topology voltage multipliers for generating voltages necessary to power such devices as microcomputers, information displays, linear support circuits for power distribution and management, as well as signal processors. However, a persistent problem has been that the efficiency of such voltage multipliers is typically low, thus resulting in an unnecessary loss of power when used to supply said devices.

Thus, what is needed is an efficient apparatus that not only generates the necessary voltage supplies, but also intelligently selects the most efficient voltage supply available for powering such devices.

DESCRIPTION OF A PREFERRED EMBODIMENT

Figure 1:
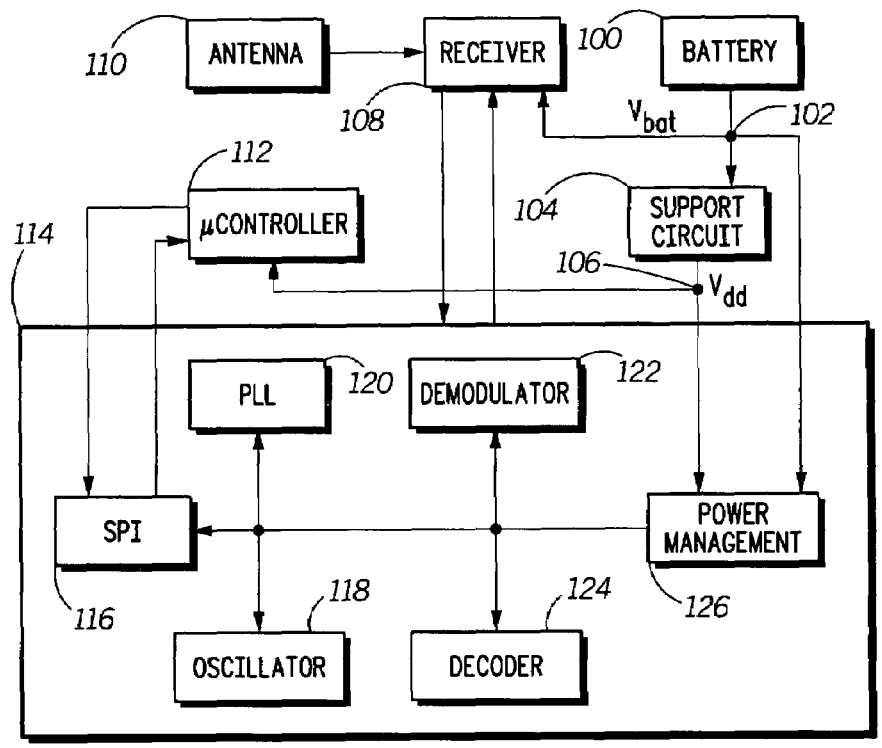
FIG. 1 is a block diagram of a selective call receiver in accordance with the preferred embodiment of the present invention.

Referring to FIG. 1, a battery 100 powered selective call receiver comprises an antenna 110 coupled to a receiver 108. The receiver 108 is coupled to a main control board 114 which may strobe the receiver on and off for power saving purposes. Furthermore, the receiver 108 couples received information to the main control board 114 where it is routed to the demodulator for processing and recovery of modulated information that may be presented to a user in any number of formats such as audio, text, video, etc.

A support circuit 104 may, and in this case does supply a multiplied voltage $V_{dd}$ 106 to a microcontroller 112 as well as a power management circuit 126 known interchangeably hereafter as an intelligent power source selection circuit 126. The power management circuit 126 has inputs of a battery voltage $V_{bat}$ 102 and the multiplied voltage from the support circuit. In the preferred embodiment of the present invention, the power management circuit 126 distributes power to at least the demodulator 122, a decoder 124, and oscillator 118, a PLL (Phase Locked Loop) 120, and an SPI (Serial Peripheral Interface) 116. Alternatively, the power management circuit 126 would also supply power to the microcontroller 112. These devices are arranged such that the selective call receiver can operate to receive radio frequency signals and recover information contained therein for presentation to the user in any number of formats as detailed above.

Figure 2:
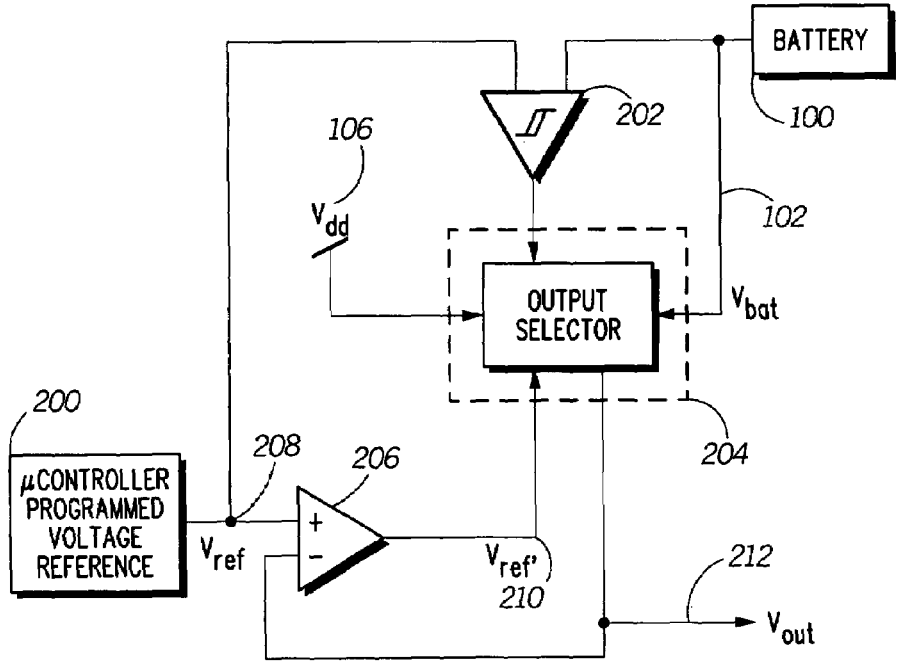
FIG. 2 is a block diagram of an intelligent power source selection circuit in accordance with the preferred embodiment of the present invention.

Referring to FIG. 2, the illustration shows a block diagram of the intelligent power source selection circuit 126 in accordance with the preferred embodiment of the present invention.

The intelligent power source selection circuit 126 operates using the battery 100, a microcontroller programmed (or fixed) voltage reference 200, and the multiplied voltage $V_{dd}$ 106. The primary purpose of the intelligent power source selection circuit 126 is to select the most efficient power source and supply that selected source to circuits associated with the portable communication or other portable device. By doing this, the time between either battery replacement or charging is significantly extended, thus making the device using this intelligent power source selection circuit 126 more desirable to a portable device user. Marketing studies have determined that a majority of portable device users will select a device that has a longer battery life over one with a shorter battery life. Therefore, devices using the present invention, considering that all other operational aspects of similar devices remain equal, will be selected by users over devices not having the present invention.

Operationally, the battery 100 is coupled to an input 102 of an output selector 204 as well as to an input of a comparator 202 having a predetermined hysteresis characteristic 202. Further, the multiplied voltage $V_{dd}$ 106 is coupled to the output selector 204. The microcontroller programmed (or fixed) voltage reference 200 is coupled to both the comparator 202 and a voltage following operational amplifier 206 that generates an output reference voltage $V_{ref}$ 210 which substantially follows a reference voltage $V_{ref}$ 208. The output voltage $V_{ref}$ 210 is then coupled to the output selector 204. Based on the flow diagram shown in FIG. 4, and in response to a magnitude of the battery voltage $V_{bat}$ 102 and the reference voltage $V_{ref}$ 208, the comparator 202 operates to couple a selection signal to the output selector 204 which in turn selects the most efficient voltage supply from the multiplied voltage $V_{dd}$ 106 and the battery voltage $V_{bat}$ 102 as $V_{out}$ 212. Selection as described here always insures that the minimum amount of power is drawn from the inefficient multiplied voltage supply over time. Thus, the battery or other primary power source will last longer since the amount of power lost to inefficient multiplier conversions is always minimized.

Figure 3:
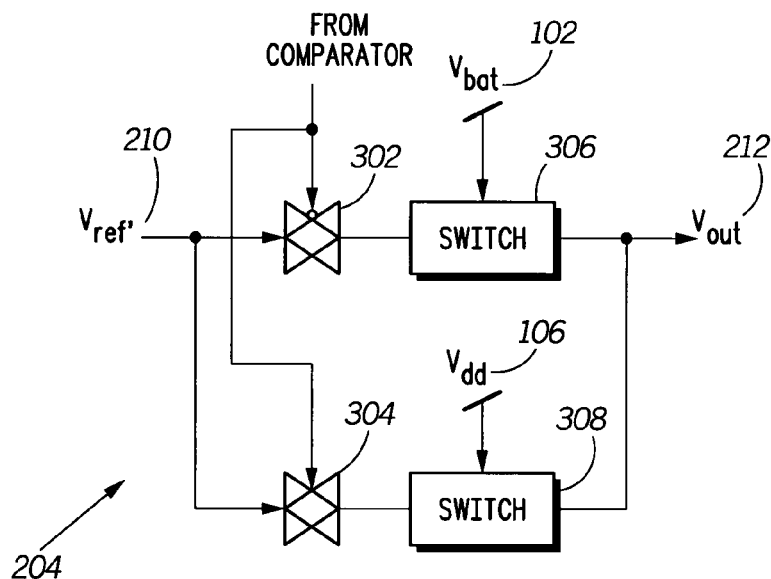
FIG. 3 is a schematic diagram of a switching circuit associated with the intelligent power source selection circuit illustrated in FIG. 2.

Referring to FIG. 3, a schematic diagram illustrates the internals of the output selector 204 which comprises a switching circuit associated with the intelligent power source selection circuit 126.

First, the output reference voltage $V_{ref}$ 210 is coupled to the inputs of two parallel transmission gates 302, 304. These transmission gates are controlled by the comparator's 202 selection signal such that when the signal is in a first state (low), transmission gate 302 is activated which couples the output reference voltage $V_{ref}$ 210 to switch 306, coupling the battery voltage $V_{bat}$ 102 as a supply for $V_{out}$ 212 which supplies a regulated voltage to circuitry within the portable device. When the comparator's 202 selection signal is in a second state (high), transmission gate 304 is activated which couples the output reference voltage $V_{ref}$ 210 to switch 308, coupling the multiplied voltage $V_{dd}$ 106 as a supply for $V_{out}$ 212 which supplies a regulated voltage to circuitry within the portable device. To prevent the generation of noise or glitches on the selected power output, the comparator has a predetermined amount of hysteresis such that the battery voltage $V_{bat}$ 102 must traverse a hysteresis window before selection of the less efficient power supply occurs. Similarly, when and if the battery voltage $V_{bat}$ 102 recovers from a drop caused by events such as a high current demand by the portable device's circuitry, the battery voltage must again traverse the hysteresis window before selection of the more efficient power supply occurs. In this manner, the circuitry powered by this invention is subjected to minimal interference due to power supply switching transients.

Figure 4:
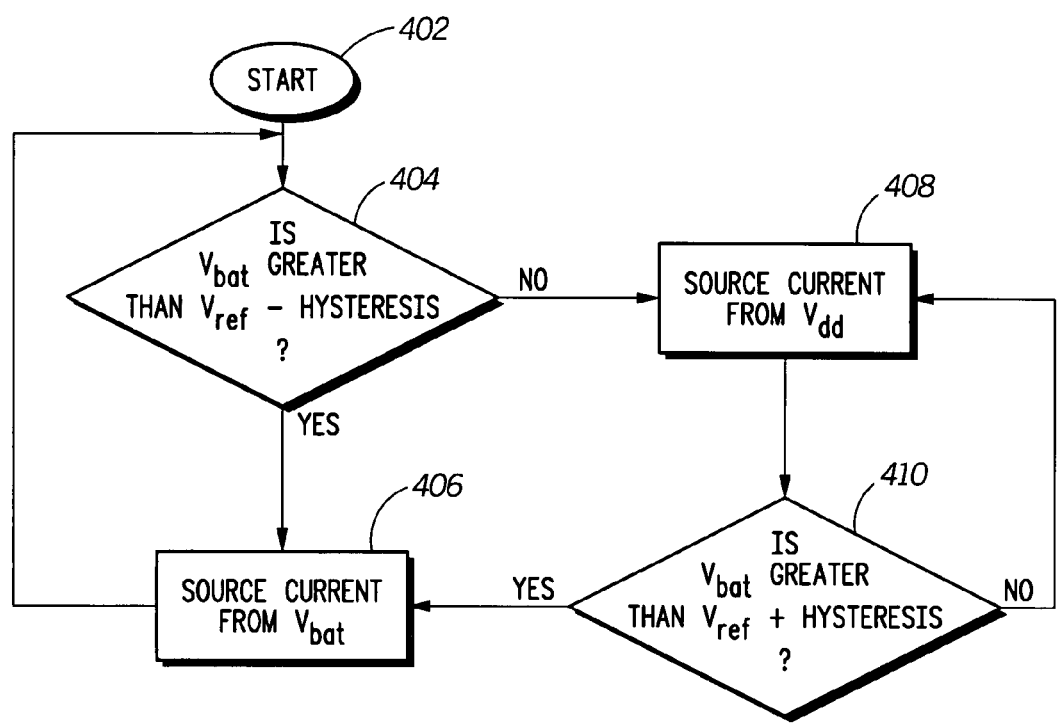
FIG. 4 is a flow diagram illustrating operation of the intelligent power source selection circuit shown in FIG. 2, in accordance with the preferred embodiment of the present invention.

Referring to FIG. 4, a flow diagram illustrates operation of the intelligent power source selection circuit 126 in accordance with the preferred embodiment of the present invention.

At power up 402, the circuit tests 404 to see if the battery voltage $V_{bat}$ 102 is greater than the output reference voltage $V_{ref}$ 210 plus the predetermined hysteresis. If this is true, the output is selected 406 to source the battery voltage $V_{bat}$ 102 as $V_{out}$ 212. If this test fails, the output is selected 408 to source the multiplied voltage $V_{dd}$ 106 as $V_{out}$ 212. Once $V_{out}$ 212 is selected as the multiplied voltage $V_{dd}$ 106, the battery voltage $V_{bat}$ 102 is tested 410 until it's magnitude is greater than a sum of the output reference voltage $V_{ref}$ 210 and the predetermined hysteresis. When that condition is true, the output is selected 406 to source the battery voltage $V_{bat}$ 102 as $V_{out}$ 212. However, if the test fails, the intelligent power source selection circuit 126 will continue to source $V_{out}$ 212 as the multiplied voltage $V_{dd}$ 106.

Figure 5:
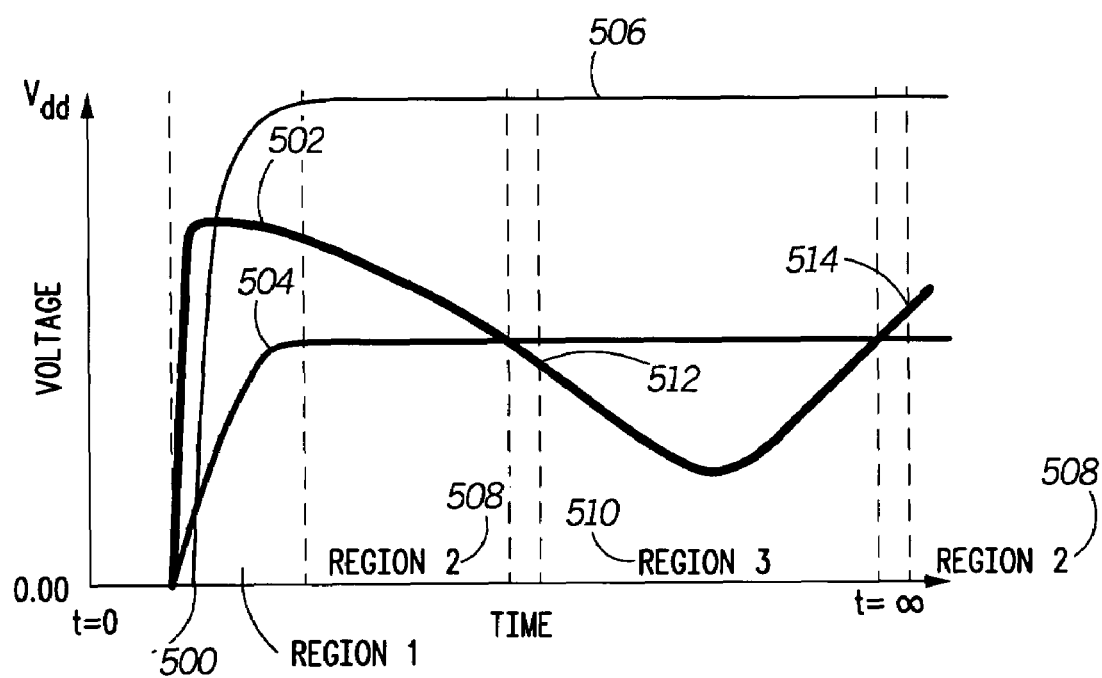
FIG. 5 is a graphical illustration of operating regions associated with the intelligent power source selection circuit shown in FIG. 2, in accordance with the preferred embodiment of the present invention.

Referring to FIG. 5, a graphical illustration shows the regions associated with operation of the intelligent power source selection circuit 126 in accordance with the preferred embodiment of the present invention.

Region 1 500 as shown in FIG. 5 is typically known as a startup region. In this region 500, power has just been activated to the circuitry associated with the portable device. Curve 502 shows the battery or primary power source voltage $V_{bat}$ 102 which rises rapidly to a point above a regulated voltage $V_{out}$ 212 shown as curve 504. Since the multiplied voltage $V_{dd}$ 106 shown as curve 506 is well below the regulated voltage $V_{out}$ 212 shown as curve 504 in this region, only one choice for the regulated voltage $V_{out}$ 212 supply is possible and it is the battery voltage $V_{bat}$ 102. In region 2 508, the battery voltage $V_{bat}$ 102 remains above the regulated voltage $V_{out}$ 212 and thus, power for regulated voltage $V_{out}$ 212 is still derived from the battery voltage $V_{bat}$ 102. Not until the point shown as 512 does the battery voltage $V_{bat}$ 102 fall below the predetermined hysteresis limit of the comparator 202, at which time the intelligent power source selection circuit 126 operates to select the multiplied voltage $V_{dd}$ 106 as a supply for $V_{out}$ 212. In region 3 510, the battery voltage $V_{bat}$ 102 remains below the regulated voltage $V_{out}$ 212 and not until the battery voltage $V_{bat}$ 102 reaches above the point where it exceeds the sum of the regulated voltage $V_{out}$ 212 and the predetermined hysteresis limit of the comparator 202, does the intelligent power source selection circuit 126 operate again to select the battery voltage $V_{bat}$ 102 as a supply for the regulated voltage $V_{out}$ 212.

As one of ordinary skill in the art would appreciate, the implementation described here is but one way to realize the claimed invention. More particularly, any semiconductor technology, e.g., CMOS, bipolar, etc, may be used to fabricate elements such as the transmission gates 302, 304, power switches 306, 308, amplifier 206, comparator 202, or associated components such as the receiver 108, demodulator 122, support circuit 104, decoder 124, and microcontroller 112. Moreover, it is contemplated that the present invention be used in conjunction with portable electronic devices such as pagers, advanced messaging devices (1-way and 2-way), smart cards, cellular and other portable telephones, personal digital assistants, and all forms of portable computing devices. Any device that requires a stable regulated voltage supply will benefit from the use of the present invention because the useful operating life of a portable device will be extended between either battery replacements or charges.

What is claimed is:

1. A power management system comprising:
   a primary power source;
   a secondary power source generated from the primary power source; and
   a power output selector coupled to the primary power source and the secondary power source, the power output selector operating to select:
   (a) the primary power source as a power supply at a desired regulated power output, during initialization of the power management system and at any other time during operation of the power management system that a magnitude of the primary power source exceeds a magnitude of the secondary power source,
   (b) the primary power source as the power supply at the desired regulated power output, at any time after initialization of the power management system that the magnitude of the primary power source exceeds the magnitude of a desired regulated power output, and
   (c) the secondary power source as the power supply at the desired regulated power output, at any time after initialization of the power management system that the magnitude of the secondary power source exceeds the magnitude of the primary power source and the magnitude of the primary power source is less than the desired regulated power output.

2. The power management system according to claim 1 wherein the primary power source is a battery.

3. The power management system according to claim 2 wherein the power supply is maintained at a nominal voltage produced by the battery.

4. The power management system according to claim 3 wherein the nominal voltage produced by the battery is approximately one volt DC.

5. The power management system according to claim 1 wherein the power supply is maintained at a voltage of substantially one volt DC.

6. The power management system according to claim 1 wherein the secondary power source has a typical operating voltage magnitude that is greater than the primary power source.

7. The power management system according to claim 1 wherein the desired regulated power output has a typical operating voltage magnitude of substantially one volt DC.

8. The power management system according to claim 1 further comprising:
   a comparator coupled to the primary power source, a reference voltage, and the power output selector, the comparator having a pair of switching thresholds defined as a difference and a sum of the reference voltage and a predetermined hysteresis voltage, respectively.

9. The power management system according to claim 8 wherein the comparator controls selection of the primary power source for power output in response to a primary power source voltage being greater than the difference between the reference voltage and the predetermined hysteresis voltage.

10. The power management system according to claim 8 wherein the comparator controls selection of the secondary power source for power output in response to a primary power source voltage being less than the difference between the reference voltage and the predetermined hysteresis voltage.

11. The power management system according to claim 8 wherein the comparator controls selection of the primary power source for power output in response to a primary power source voltage being greater than the sum of the reference voltage and the predetermined hysteresis voltage.

12. The power management system according to claim 8 further wherein the comparator controls selection of the secondary power source for power output in response to a primary power source voltage less than the sum of the reference voltage and the predetermined hysteresis voltage.

13. The power management system according to claim 8 wherein the power output selector comprises:
- a first switch coupled to the comparator and having an input coupled to the primary power source; and
- a second switch coupled to the comparator and having an input coupled to the secondary power source;
- wherein the first switch and the second switch are activated in a mutually exclusive manner to provide for power output at a common output.

14. A power management system comprising:
- a primary power source;
- a secondary power source generated from the primary power source;
- a comparator coupled to the primary power source, a reference voltage, and the power output selector, the comparator having a switching threshold defined as a difference of the reference voltage and a predetermined hysteresis voltage; and
- a power output selector coupled to comparator, the primary power source and the secondary power source, the power output selector operating to select:
  - (a) the primary power source as a power supply at a desired regulated power output, during initialization of the power management system and at any other time during operation of the power management system that a magnitude of the primary power source exceeds a magnitude of the secondary power source by a magnitude determined as a difference between the reference voltage and the predetermined hysteresis voltage,
  - (b) the primary power source as the power supply at the desired regulated power output, at any time after initialization of the power management system that the magnitude of the primary power source exceeds the magnitude of a desired regulated power output by the magnitude determined as the difference between the reference voltage and the predetermined hysteresis voltage, and
  - (c) the secondary power source as the power supply at the desired regulated power output, at any time after initialization of the power management system that the magnitude of the secondary power source exceeds the magnitude of the primary power source by the predetermined hysteresis voltage and the magnitude of the primary power source is less than the desired regulated power output.

15. The power management system according to claim 14 wherein the primary power source is a battery.

16. The power management system according to claim 14 wherein the secondary power source has a typical operating voltage magnitude that is greater than the primary power source.

17. The power management system according to claim 14 wherein the power output selector comprises:
- a first switch coupled to the comparator and having an input coupled to the primary power source; and
- a second switch coupled to the comparator and having an input coupled to the secondary power source;
- wherein the first switch and the second switch are activated in a mutually exclusive manner to provide for power output at a common output.

* * * * *